United States Patent [19]

Circello et al.

[11] Patent Number: 4,538,238
[45] Date of Patent: Aug. 27, 1985

[54] METHOD AND APPARATUS FOR CALCULATING THE RESIDUE OF A SIGNED BINARY NUMBER

[75] Inventors: Joseph C. Circello, Phoenix; Russell W. Guenthner, Glendale, both of Ariz.

[73] Assignee: Honeywell Information Systems Inc., Phoenix, Ariz.

[21] Appl. No.: 458,794

[22] Filed: Jan. 18, 1983

[51] Int. Cl.³ .............................................. G06F 7/38
[52] U.S. Cl. .................................................... 364/746
[58] Field of Search ................... 364/746, 739; 371/53, 371/54

[56] References Cited

U.S. PATENT DOCUMENTS

| 3,980,874 | 9/1976 | Vora | 364/746 |
| 4,107,783 | 8/1978 | Huang | 364/746 |
| 4,281,391 | 7/1981 | Huang | 364/746 |
| 4,298,952 | 11/1981 | Guenthner et al. | 364/786 |

OTHER PUBLICATIONS

Liu et al., "Residue Generator of Binary Numbers in 2's Complement Form", *IBM Technical Disclosure Bulletin*, vol. 9, No. 2, pp. 158-159, Jul. 1966.
Banerji et al., "Sign Detection in Residue Number Systems", *IEEE Trans. on Computers*, vol. C-18, No. 4, pp. 313-320, Apr. 1969.

*Primary Examiner*—James D. Thomas
*Assistant Examiner*—Dale M. Shaw
*Attorney, Agent, or Firm*—A. A. Sapelli; J. S. Solakian; E. W. Hughes

[57] ABSTRACT

Method and apparatus for calculating the residue of a signed binary number of "n" bits with respect to a given check base m where $m = 2^b - 1$. The bits of the binary number excluding the sign bit are partitioned into number segments, each of b bits starting with the least significant bit. If $(n-1)$ is not an even multiple of b, higher order bit positions of the number segment containing the next most significant bit of the binary number are filled with logical zeros. A sign segment of b bits is formed. Both number and sign segments have boundaries. The bit position in the sign segment relative to a sign segment boundary which corresponds to the bit position of the sign bit "s" relative to the nearest boundary of a number segment is filled with a logical zero. All other bit positions of the sign segment are filled with the sign bit. The number and sign segments are applied to carry save adders to reduce the number segments and sign segment to a single sum segment and a single rotated carry segment. A rotated carry segment is a carry segment produced by a carry save adder, the most significant bit of which becomes the least significant bit of the rotated carry segment. The other bits of the carry segment and their significance are increased by one in the rotated carry segment. Carry segments produced by carry save adders of one level are converted to rotated carry segments before being applied to a carry save or full adder of a lower level. The single sum segment and single rotated carry segment produced by the lowest level carry save adder is applied to a one's complement adder. The b bit output of the one's complement adder is the residue of the signed binary number to the check base $(2^b - 1)$.

12 Claims, 5 Drawing Figures

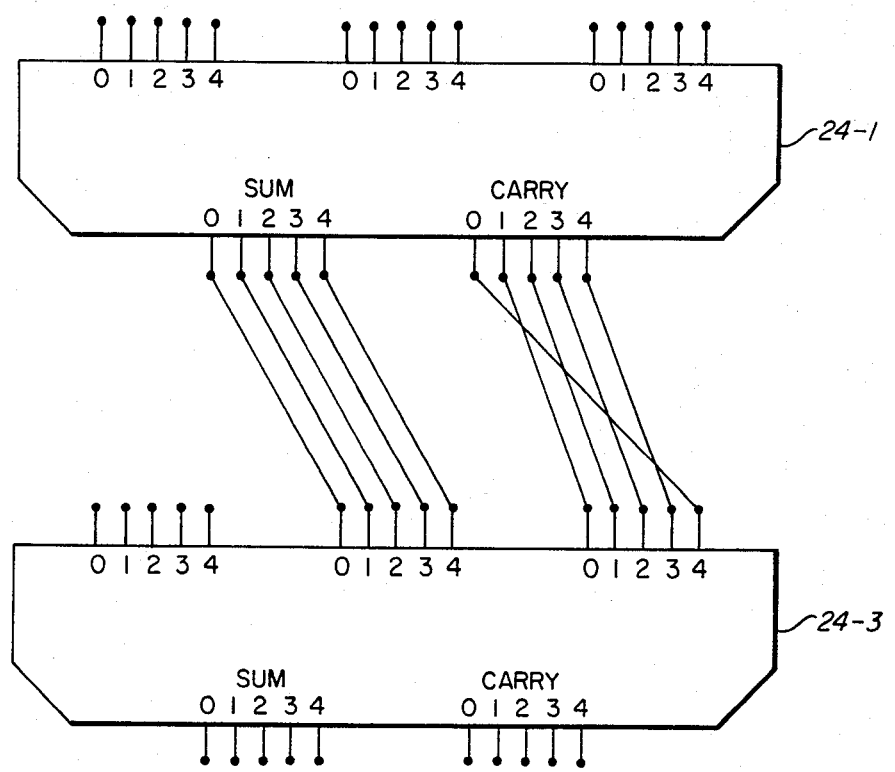
Fig-3
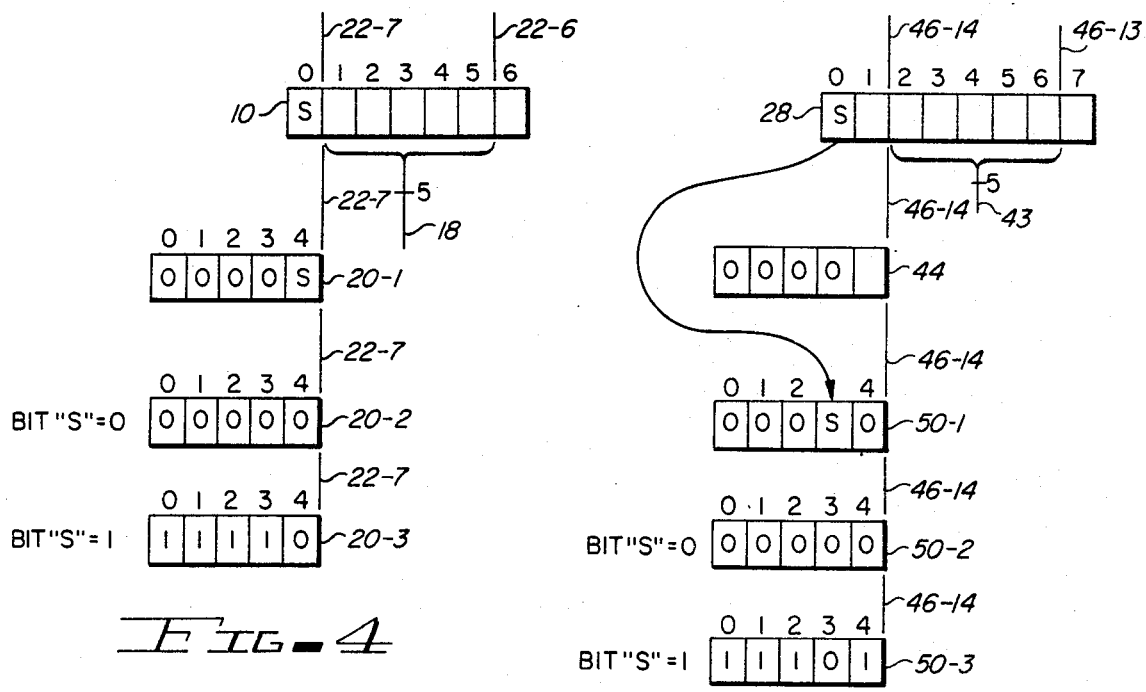
Fig-4
Fig-5

METHOD AND APPARATUS FOR CALCULATING THE RESIDUE OF A SIGNED BINARY NUMBER

BACKGROUND OF THE INVENTION

1. Field of the Invention

This invention is in the field of methods and apparatus for calculating the residue of a signed binary number with respect to a predetermined check base. The residue of such numbers can be used in binary and arithmetic units of a digital data processing system to check the accuracy of arithmetic operations performed on two operands, each of which operations produces a result.

2. Description of the Prior Art

The most relevant prior art of which the applicants are aware that in the concurrently filed U.S. patent application Ser. No. 06/458,795, filed Jan. 18, 1983 entitled "METHOD AND APPARATUS FOR CALCULATING THE RESIDUE OF A BINARY NUMBER" by Joseph C. Circello which is assigned to Honeywell Information Systems Inc., the assignee of this invention, the disclosure of which is incorporated herein by reference. That invention describes and claims method and apparatus for calculating the residues of binary numbers with respect to a check base of the form of $2^b-1$. The bits of the binary number are partitioned into segments, each of b bits starting with the least significant bit. If the number of bits n in the binary number is not an even multiple of b, the higher order bit positions of the segment containing the most significant bit of the binary number are filled with zeros. The segments are applied to levels of carry save adders to reduce the segments to a single sum and a single rotated carry segment where a rotated carry segment is a carry segment produced by a carry save adder, the most significant bit of which is rotated so as to become the least significant bit of the rotated carry segment. Carry segments produced by carry save adders of one level are converted to rotated carry segments before being applied to a carry save adder of a lower level. When the segments are reduced to a single sum segment and a single rotated carry segment which is produced by the lowest level carry save adder, the single sum segment and single rotated carry segment are applied to a one's complement full adder. The resultant is a b bit residue of the binary number. The method and apparatus of the above-identified application, the disclosure of which is incorporated by reference into this application, provides a significantly faster way of calculating the residue of large binary numbers, but it is limited to calculating the residues of unsigned numbers. Thus, there is a need for a method and apparatus for calculating the residue of signed binary numbers rapidly and efficiently since a substantial number of the binary arithmetic calculations in a digital data processor involves signed numbers, typically in the two's complement notation.

BRIEF SUMMARY OF THE INVENTION

The present invention provides both method and apparatus for more quickly calculating the residue of a signed binary number "X" of "n" bits with respect to a check base "m". The binary number X can be considered as consisting of two numbers, a positive number which involves all of the bits of the binary number other than the sign bit or of the bits of lesser significance than the sign bit, which is the most significant bit and is a negative coefficient. The bits of the binary number X where $X = -x(0)2^{n-1} + x(1)2^{n-2} \ldots + x(n-1)2^0$ other than the sign bit can be divided or partitioned into a plurality of number segments of "b" bits each. The value of m is defined by the quantity $2^b - 1$. In the foregoing, m and n are limited to being integers other than zero. To properly handle the sign bit, a separate sign segment is formed. The boundaries between segments, segment boundaries, particularly between the number segments, occur between adjacent bit positions of the binary number. The sign bit segment of b bits has one bit position, the sign position, which corresponds to the sign bit's position relative to a number segment boundary. This sign position in the sign segment is always a logical zero and the other bit positions of the sign segment are filled with the sign bit. Thus, when the sign bit is zero or the binary number is positive, the bits of the sign segment are all logical zeros. When the sign bit is a logical one, the binary number is negative and all the bits of the sign segment except that in the sign position are logical ones, and the sign segment represents, the residue of the sign bit. The number segments and sign segments of the binary number are applied to carry save adders, each of which has the capability of adding three segments of b bits and of producing a sum segment and a carry segment each of b bits. The carry save adders of this invention can be considered as being arranged in levels with the lowest level consisting of a single carry save adder. The bits of the carry segments of b bits produced by each carry save adder are rotated so that the most significant bit of a carry segment becomes the least significant bit of the corresponding rotated carry segment with the other bits of the carry segment being shifted to the left or to a more significant bit position by one position which causes the addition to be performed in one's complement notation. The sum segment and the rotated carry segment from the lowest carry save adder are applied to a one's complement full adder. The sum segment of b bits produced by the full adder is the residue of the signed binary number with respect to check base m.

It is, therefore, an object of this invention to provide improved methods and apparatus for calculating the residue of a signed binary number with respect to a given check base.

It is another object of this invention to provide a fast method and apparatus for calculating the residue of a signed binary number with respect to a given check base such that the technique of residue checking can be used to validate the accuracy of arithmetic operations in digital data processing systems.

BRIEF DESCRIPTION OF THE DRAWINGS

Other objects, features and advantages of the invention will be readily apparent from the following description of certain preferred embodiments thereof taken in conjunction with the accompanying drawings, although variations and modifications may be effected without departing from the spirit and scope of the novel concepts of the disclosure and in which:

FIG. 3 illustrates the manner in which the bits of a carry segment are rotated to produce a rotated carry segment.

FIG. 4 illustrates the formation of the sign segment for a 36-bit operand with respect to a check base of 31.

FIG. 5 illustrates the formation of the number segment containing the most significant bit of the positive portion, bit 1 of a 72-bit binary number operand and the sign segment with respect to a check base of 31.

DETAILED DESCRIPTION OF THE INVENTION

Figure 1:
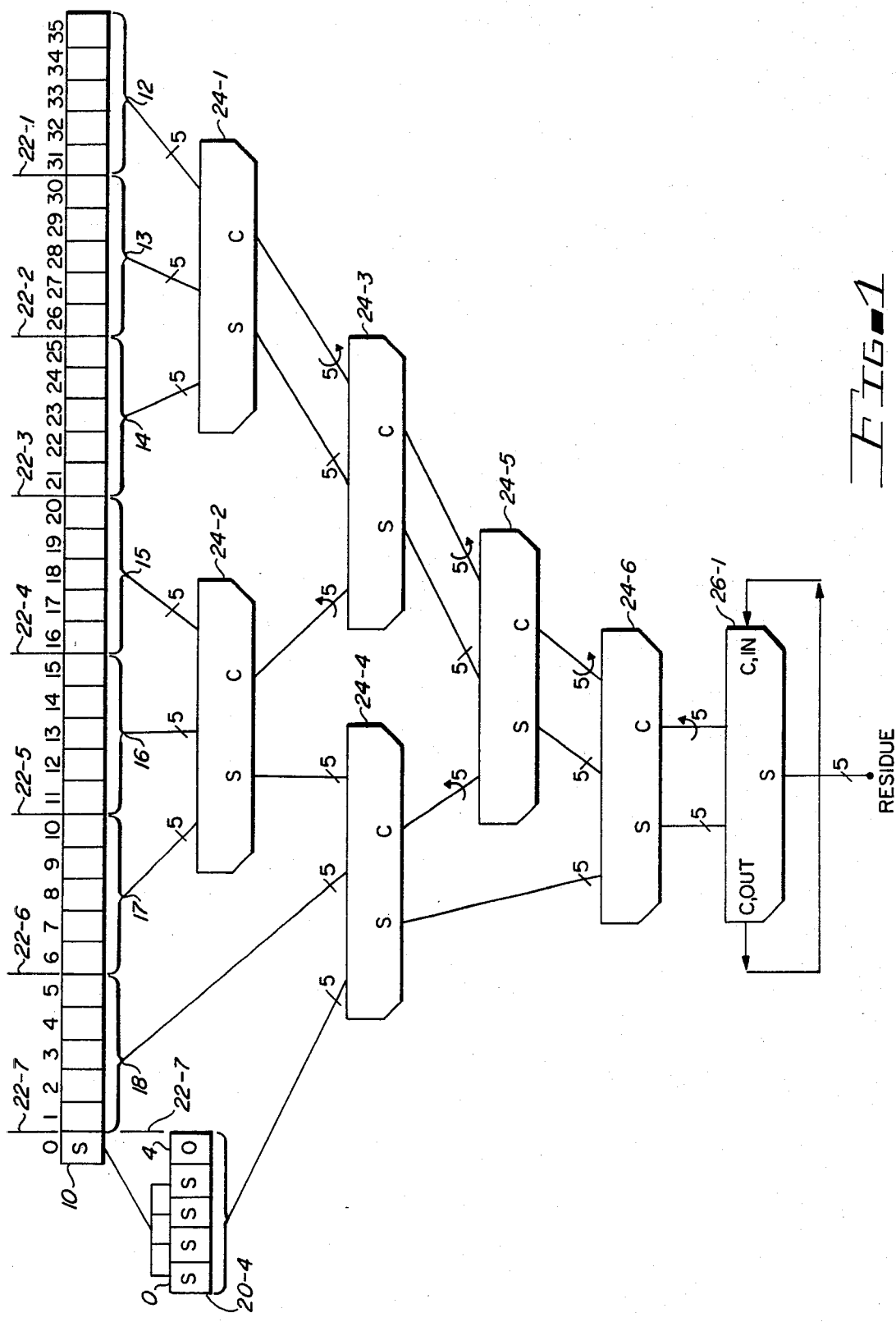
FIG. 1 is a schematic diagram of the apparatus of the invention for calculating the residue of a signed 36-bit signed binary number with respect to a check base of m=31.

In FIG. 1, operand 10 is a signed 36-bit binary number in 2's complement notation, the residue of which is to be calculated with respect to a check base m. In the preferred embodiment, m=31. Since $m=2^b-1$, b, the number of bits in a segment in the preferred embodiment is 5. The value of b is, of course, subject to choice and can be that of any positive integer which is greater than 1, with values typically being 3, 4, 5, etc.

In FIG. 1, the lower order 35 bits of signed binary number 10, bits number 1–35, form the positive portion of binary number 10. Bits 1–35 are partitioned into 7 numbered segments, 12–18, each of five contiguous bits beginning with number segment 12, which includes the least significant bit 35 of operand 10 in the least significant bit position of segment 12. In addition, a sign segment 20-4 of 5 bits is formed. Common segment boundaries 22-1 to 22-6 occur between adjacent sum segments 12 through 18. Segment boundary 22-7 which is located between bit positions 0, and 1 of number 10 is between or common to, sum segment 18 and sign segment 20, in this example.

To calculate the residue of a signed binary number requires that a sign segment 20 be formed which segment has the same number of bits as the numbered segments; namely, five. It is also required that the sign segment have, or share, a segment boundary with that numbered segment in which all of the bit positions are filled with the higher order positive bits of the binary number 10. In this case, that segment is segment 18. The most significant bit of the positive component of operand 10 is in bit position 1 which occupies the most significant bit position of number segment 18.

In forming sign segment 20−1, as illustrated in FIG. 4, the bit position of segment 20−1 relative to boundary 22-7 which corresponds to the bit position of sign bit "s" relative to boundary 22-7 in operand 10; namely, bit 0, is bit 4 of sign segment 20-1. The other bit positions of sign segment 20-1 are filled with logical zeros as illustrated in FIG. 4. Sign segment 20-1 can have two values as illustrated in FIG. 4. If bit s is a logical zero, all the bits of sign segment 20-1 as illustrated by sign segment 20-2 will be logical zeros. If the sign bit "s" is a logical one, all of the bits of segment 20-1 are complemented so that all bit positions are filled with logical ones except the sign position which is a logical zero as illustrated by segment 20-3. The same result is accomplished in FIG. 1 by filling bit positions 0–3 of segment 20-4 with the binary value of the sign bit s and filling bit 4 of segment 20-4, which bit position corresponds to that of the sign bit s in operand 10, with a logical zero. It should be noted in FIG. 1 that the most significant bit of the positive component of binary number 10; namely, bit 1, occupies the most significant bit position of number segment 18. A bit position such as bit position 4 of sign element 20-4 can be filled with a logical zero by connecting the output of a bistable device, such as a flip flop, to that bit position or by that bit position being connected to ground if a logical zero is defined as being ground potential.

The signals of number segments 12 through 18 and of sign segment 20-4 are applied to the input terminals of selected ones of carry save adders 24-1 through 24-6. Carry save adders 24, in the preferred embodiment, each has the capability of adding three sets of binary signals, or segments of input signals and of producing a set of signals representing the sum of the applied segments, a sum segment of five bits, and a set of signals representing the carry bits produced by the carry save adder. A carry segment also has five bits in the preferred embodiment.

In FIG. 3, the manner of connecting the signals of the sum and carry segments produced by carry save adder 24-1 to two of the three sets of input terminals of carry save adder 24-3 are illustrated. Particular attention is directed to the manner of connecting the signals of the carry segment produced by carry save adder 24-1 to one of the three sets of input terminals of carry save adder 24-3, so that the signals of the carry segment produced by carry save adder 24-1 are rotated, or shifted, to the left with the most significant bit, bit 0 of the carry segment, being connected to the least significant input terminal, terminal 4, of one of the three sets of input terminals of carry save adder 24-3. Each of the other bits of the carry segments are shifted to the left one bit position so that each occupies a more signficant bit position by one such position in the rotated carry segment applied to the input terminals of carry save adder 24-3. Summarizing, connecting the signals of the carry segment to the input terminals of a lower level adder, as illustrated in FIG. 3, produces a rotated carry segment. The manner in which this is accomplished, in the preferred embodiment, is by the use of a bus of five conductors, with one conductor being used for each of the five bits of the carry segment, which bus connects the signals of the carry segment as available at the output terminals of carry save adder 24-1 to one of the three sets of input terminals of carry save adder 22-3.

Figure 2:
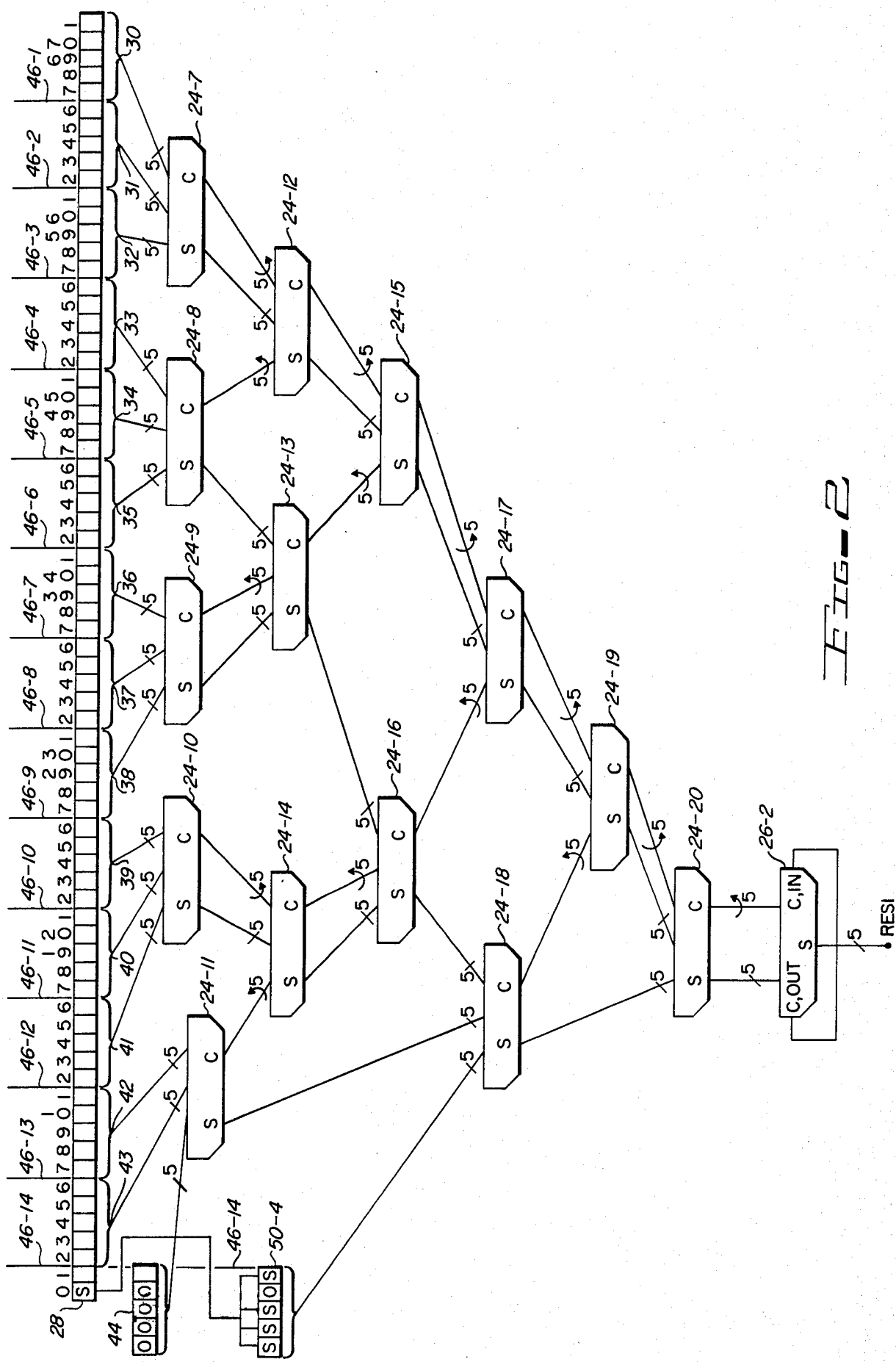
FIG. 2 is a similar schematic diagram of apparatus for calculating the residue of a 72-bit signed binary number with respect to a check base of m=31.

In FIGS. 1 and 2 particularly, a bus for a segment of five bits is illustrated as being a single line. A bus with a curved arrow intersecting it rotates the signals of a carry segment, for example, to produce a rotated carry segment. The signals of the rotated carry segment may be applied to a set of input terminals of another lower level carry save adder, as illustrated in FIG. 3, or to a one's complement full adder. In FIGS. 1 and 2, a bus with a short diagonal straight line intersecting it applies the bits of a sum segment, for example, to the input terminals of another adder without changing the order of the bits. This is the manner in which the signals of the sum segment produced by carry save adder 21-4 are connected to one set of input terminals of the carry save adder 24-3 is illustrated in FIGS. 3. The number 5 proximate the curved arrow of the short diagonal straight line of each bus identifies the number of conductors comprising the bus.

In FIG. 1, the signals of the segments 12, 13 and 14 are the inputs to carry save adder 24-1 and the signals of segments 15, 16, and 17 are the inputs to carry save adder 24-2. Carry save adders 24-1 and 24-2 constitute the highest level of carry save adders 24 of the apparatus illustrated in FIG. 1. The next level of carry save adder 24 consists of carry save adders 24-3 and 24-4. Carry save adder 24-3 has applied to it as inputs the signals of the rotated carry segment of carry save adder 24-1, the signals of the sum segment of carry save adder 24-1, and the signals of the rotated carry segment of carry save adder 24-2. Carry save adder 24-4 has applied to it as in inputs the sum segment signals of carry save adder 24-2 and the signals of number segment 18 and sign segment 20-4. The next lower level of carry save adders 24 consists of carry save adder 24-5, which has applied to it as one input the rotated carry segment signals produced by carry save adder 24-3, and, as a second input, the signals of the sum segment of carry save adder 24-3. The third input to carry save adder 24-5 is the signals of the rotated carry segment of carry save adder 24-4. The next lowest, the fourth level of carry save adders; namely, carry save adder 24-6, has as its inputs the rotated carry segment signals and sum segment signals produced by carry save adder 24-5 and the sum segment signals of carry save adder 24-4. The function of the carry save adders 24 is to reduce the number segments 12-18 and the sign segment 20-4 to a single sum and a single carry segment which represents the addition in one's complement notation of the segments 12 through 18 and 20-4. The signals representing the sum and rotated carry segments produced by the lowest level carry save adder 22-6 are applied to the one's complement full adder 26-1, which can be as described and claimed in U.S. Pat. No. 4,298,952, which issued on Nov. 3, 1981. The five bits produced by one's complement full adder 26-1 are the residue of signed binary number operand 10 to the check base 31.

The number of carry save adders and the number of levels of such adders required to calculate the residue of a signed binary number is a function of the number of bits of the binary number X whose residue r is to be calculated and the choice of the check base m which determines the number of bits b per segment into which X is partitioned. It should be noted that the order in which the number segments and sign segment are added is not critical, it only being necessary that the signals of all of the segments, number and sign, of the operand 10 be applied as inputs to a carry save adder and that the sum and rotated carry segments of higher level carry save adders be continually applied to additional carry save adders until the sum of the segments is reduced to a single sum and a single rotated carry segment.

The advantage of implementing the apparatus for calculating the residue of a signed binary number with respect to a given check base, as illustrated in FIG. 1, is that the carry save adders 24 function at approximately 3-4 times the speed of a corresponding full adder. As a result, the residue of a signed binary number can be determined and be available for use in verifying the accuracy of an arithmetic operation involving that binary number several times more quickly than if the determination of the residue were calculated using only one's complement full adder.

In FIG. 2, the apparatus for determining, or calculating, the residue of signed binary number 28 to 72 bits with respect to the check base of $m=31$ is illustrated. The positive portion of binary number, or operand, 28 is divided, or partitioned, into a plurality of number segments 30-44 of five bits per segment. The least significant bit 71 of operand 28 is the least significant bit of number segment 30. The balance of the number segments through segment 44 and the bits of operand 28 comprising them continue in order of increasing significance until segment 44 is reached. Segment 44 includes bit 1 of operand 28, the most significant bit of the positive portion, or component, of binary number 28 and the next most significant bit of number 28.

Bit 1 of operand 28 lies to the left of segment boundary 46-14, as is best illustrated in FIG. 5. Under such circumstances, there is a requirement for number segment 44. In number segment 44, bit 1 occupies the same position relative to boundary 46-14 as it does in operand 28. The higher order bit positions of segment 44 are filled with logical zeros by a conventional source of signals such as a flip flop, or by being connected to ground if a logical zero is defined as being ground potential. Since the operand 28 is a signed binary number in two's complement notation, in the preferred embodiment, a sign segment 50 must also be formed. The sign bit "s" is the most significant bit, bit 0, of operand 28. As is illustrated in FIG. 5, the bit position in sign segment 50-1, which corresponds to the position of the sign bit "s" relative to boundary or partition, 46-14, bit position 3 of sign segment 50-1 is filled by the sign bit s. The other bit positions of sign segment 50-1 are filled with logical zeros. Sign segment 50-1, as is the case with sign segment 20-1, can have two values. If "s" is a logical zero, then all bit positions will be zeros, as illustrated by sign segment 50-2. If "s" is a logical 1, then the bits of signal segment 50-1 will be complemented to produce sign segment 50-3, in which all bit positions are filled with logical ones with the exception of the bit position corresponding to the location of the sign bit in operand 28 relative to boundary 46-14. As illustrated in FIG. 2, the same result can be obtained by filling all bit positions of the sign segment 50-4, with the value of the sign bit "s" except that bit position which corresponds to the position of sign bit s of operand 28 relative to the nearest common boundary 46-14, which position is always filled with a logical zero.

In FIG. 2, the number segments 30-44 can be and are illustrated as being applied to the first level of carry save adders 24-7 through 24-11. The sum and rotated carry segments produced by adders 24-7 through 24-11 are then applied to a second level of carry save adders 24; namely, carry save adders 24-12, 24-13, and 24-14. The third level of carry save adders 24 consists of carry save adders 24-15 and 24-16, which have the sum and rotated carry segments from the preceding level of carry save adders 24 applied to them. To reduce the number segments and sign segment of operand 28 to a single sum segment and a single carry segment requires, in this example, a fourth, a fifth, and a sixth level of carry save adders with the lower level consisting of carry save adder 24-20. It should be noted that sign segment 50-4 is applied to carry save adder 24-18 in the fourth level of such adders. The sum and rotated carry segments produced by carry save adder 24-20 are applied to the input terminals of one's complement full adder 26-2. The sum segment of five bits produces by one's complement full adder 26-2 is the residue of the signed 72-bit operand 28.

In FIG. 2, as in FIG. 1, a line with an intersecting short straight line represents a bus in which the order of signals of the segment transmitted by that bus remains the same; i.e., they are not rotated. A line with an intersecting curved arrow represents a bus in which the conductor carrying the most significant bit of a carry segment, for example, is connected to the least significant input terminal of a succeeding carry save adder or full adder. The number associated with the intersecting short straight line or curved arrow identifies the number of conductors of the bus.

In the calculation of the residue of a signed binary number, the requirement for a sign segment may increase the number of segments that must be added together to produce a residue with respect to a given check base by one compared with the number required if limited to unsigned operands. This, of course, is the case if the sign bit does not occupy the least significant bit position of the sign segment, or, stated another way, that a segment boundary does not exist between the sign bit and the most significant bit of the positive component of the number. With respect to a 72-bit operand, such as operand 28, the sign bit is two bit positions to the left of common segment boundary 46-14. Thus, an extra segment is required, one for the sign bit and one for bit 1, the most significant bit of the positive component. The apparatus of FIG. 2 requires an additional, one addition, carry save adder compared to that required to determine the residue of a 72-bit unsigned binary number. The manner of connecting, or applying, the segments sign and number to the carry save adders is, of course, a matter of choice, the goal being that every set of input terminals of each carry save adder be utilized to reduce the number segments and the sign segment of a signed operand to a single sum and a single carry segment as quickly and as efficiently as possible.

The apparatus and method of this invention permits the calculation in a digital binary computer of the residue of a signed binary number. In addition to being able to calculate such as residue, the apparatus of the invention which uses carry save adders except for the final step significantly increases the speed at which such residues can be calculated. As a result, it is practical to use residue checking theory to verify the accuracy of arithmetic operations performed in a binary computer on binary numbers, particularly large signed binary numbers.

The number of bits in a segment is a matter of choice and typically is a function of the number of bits that the one's complement full adder is capable of handling. The manner of connecting buses to apply the signals of segments between and to levels of adders is also a matter of choice. To minimize the time to calculate a residue, as well as the amount of logic circuitry required, it is essentially mandatory that the signals of three segments be applied to each carry save adder to reduce the sum of the segments or to cause the results to converge to a single rotated carry segment and a single sum segment as quickly as possible and after passing through the minimum number of carry save adders.

What is claimed is:

1. Apparatus for calculating the residue of a signed binary number in two's complement notation, in which the most significant bit of the binary number is a sign bit, the bits of the binary number of lesser significance than the sign bit being partitioned into a plurality of equally sized number segments having segment boundaries, comprising:

circuit means for forming a sign segment having a segment boundary in which the sign position of the sign segment is filled with a logical zero and occupies the same position in the sign segment relative to a sign segment boundary as the sign bit of the number occupies with respect to the nearest boundary of a number segment, the other bit positions of the sign segment being filled with the sign bit;

carry save adder means for adding in 1's complement notation the number segments and sign segment and for reducing said segments to a single sum segment and a single rotated carry segment the single rotated carry segment being a carry segment wherein each bit position of the carry segment is increased in its bit significance by one, and further wherein the most significant bit is rotated to the least significant bit position; and one's complement full adder means for adding said single sum and single rotated carry segment to produce the residue of said signed binary number.

2. Apparatus as defined in claim 1 in which the check base equals the quantity $2^b-1$, where b is an integer greater than 1 and the number of bits in a segment equals b.

3. Apparatus as defined in claim 2 in which $b=5$.

4. Apparatus as defined in claim 3 in which the number of bits in the binary number is a multiple of 9.

5. Apparatus for calculating the reside of a signed binary number of "n" bits in the two's complement notation with respect to a check base "m", the quantity $(n-1)$ bits of said number being of lesser significance than the sign bit, and being partitioned into number segments of b bits each with each number segment having segment boundaries, where $m=(2^b-1)$ and m, n, and b are positive integers greater than one, comprising:

circuit means for forming a sign segment of b bits, the bit position of the sign segment corresponding to the bit position of the sign bit in the binary number with respect to a boundary of a number segment being filled with a logical zero, and all other bit positions of the sign segment being filled by the sign bit;

carry save adder means for adding the bits of the number and sign segments and for producing a sum segment and a carry segment each of b bits, the lowest level of the carry save adders consisting of a single carry save adder, means for rotating the bits of each carry segment produced by each carry save adder so that the most significant bit of each carry segment becomes the least significant bit of its corresponding rotated carry segment;

circuit means for applying the number and sign segments of the binary number and the sum and rotated carry segments to carry save adders to reduce them to a single sum segment and a single rotated carry segment;

a one's complement full adder for producing a sum in 1's complement notation of said single sum segment and said single rotated carry segment;

and circuit means for applying said sum segment and said rotated carry segment to the full adder, said full adder producing the sum in 1's complement notation of said sum segment and said rotated carry segment, said sum being the residue of said signed binary number with respect to the check base.

6. The apparatus of claim 5 in which $b=5$.

7. The apparatus of claim 6 in which n equals a multiple of 9.

8. The apparatus of claim 7 in which the means for rotating the bits of each carry segment includes a bus having conductors for each bit of each carry segment and in which the conductor of the most significant bit of the carry segment is adapted to be connected to the least significant input terminal of a lower level adder.

9. The method of calculating the residue of a signed binary number with respect to a given check base, comprising the steps of:

partitioning the bits of the binary number other than the sign bit into number segments, each of b bits per number segment starting with the least significant bit of the binary number, each of said number segments having boundaries;

forming a sign segment of b bits in which the bit position in the sign segment corresponding to that of the sign bit relative to the closest boundary of a number segment is filled with a logical zero and all other bit positions are filled with the sign bit;

applying the number and sign segments to a plurality of carry save adders, each of which produces a sum segment and carry segment each of b bits;

rotating the bits of each carry segment to form rotated carry segment in which the most significant bit of each carry segment becomes the least significant bit of its corresponding rotated carry segment;

reducing the sign and number segments and the sum and rotated carry segments produced by carry save adders to a single sum segment and a single rotated carry segment; and adding the single sum segment and single rotated carry segment in a one's complement adder to produce the residue of said signed binary number with respect to the given check base.

10. The method of claim 9 in which the check base equals the quantity $2^b - 1$.

11. The method of claim 10 in which b is an integer greater than 2.

12. The method of claim 11 in which b equals 5.

* * * * *